United States Patent [19]

Fontenot

[11] Patent Number: 4,531,549

[45] Date of Patent: Jul. 30, 1985

[54] VALVE MEANS AND FLUID TRANSPORT SYSTEM

[75] Inventor: Delouis J. Fontenot, Borger, Tex.

[73] Assignee: Phillips Petroleum Company, Bartlesville, Okla.

[21] Appl. No.: 449,934

[22] Filed: Dec. 15, 1982

[51] Int. Cl.$^3$ .............................................. F16K 3/22
[52] U.S. Cl. ................... 137/864; 137/871; 137/DIG. 2; 251/144; 251/299
[58] Field of Search ................ 137/864, 871, DIG. 2; 251/144, 147, 299, 300, 303

[56] References Cited

U.S. PATENT DOCUMENTS

| | | |
|---|---|---|
| 49,858 | 9/1865 | Clark . |
| 1,044,124 | 11/1912 | Bessert . |
| 1,068,349 | 7/1913 | Lane et al. ...................... 251/144 X |
| 1,684,905 | 9/1928 | Bastian . |
| 1,749,119 | 3/1930 | Wilson .............................. 251/144 X |
| 2,024,548 | 12/1935 | Struve ................................ 137/104 |
| 2,598,605 | 5/1952 | Robinson ........................ 137/864 X |
| 2,752,948 | 7/1956 | St. Clair .......................... 251/303 X |
| 3,386,633 | 6/1968 | Nadrich et al. ................. 251/144 X |
| 3,595,270 | 7/1971 | McNeal, Jr. ........................ 137/595 |
| 4,186,607 | 2/1980 | Porter et al. ..................... 73/422 GC |
| 4,192,349 | 3/1980 | Schroeder ....................... 251/303 X |

FOREIGN PATENT DOCUMENTS

| | | | |
|---|---|---|---|
| 292611 | 4/1966 | Australia ............................. | 137/864 |
| 1328055 | 4/1963 | France ................................. | 137/509 |

Primary Examiner—A. Michael Chambers
Assistant Examiner—John C. Fox
Attorney, Agent, or Firm—C. F. Steininger

[57] ABSTRACT

A valve having at least one passage through the valve body and terminating in a port at one end of the valve body, a stem means extending through the valve body having a stem operating means on one end thereof and having the other end thereof terminating beyond the one end of the valve body and a closure means mounted on the free end of the stem means adapted to be rotated through an arc from a first position removed from the port to a second position adjacent the port, and having a closure element thereon adapted to close the port in the second position, whereby rotation of the stem moves the closure means from a first position, at which the fluid is admitted to the passage through the port, to the second position, at which fluid is prevented from entering the passage through the port. A system including the valve is provided for transporting fluid to or from a vessel containing the fluid, such as a sample of the fluid, from the vessel and at least one flow line is connected to the end of the passage opposite the end opening into the vessel for the transport of fluid to and from the passage. The flow line preferably includes means for introducing a purge fluid through the passage.

13 Claims, 7 Drawing Figures

VALVE MEANS AND FLUID TRANSPORT SYSTEM

The present invention relates to valve means and a fluid transport system including such valve means. More specifically, the present invention relates to a valve means and a fluid transport system including such valve means for the transfer of normally non-fluent materials.

BACKGROUND OF THE INVENTION

In numerous manufacturing and material handling operations, it is necessary to transfer normally non-fluent materials, such as liquids, which are too viscous to flow at ambient conditions, comminuted solids, slurries of comminuted solids, normally solid materials, which are liquefied at elevated temperatures, etc. It is, of course, necessary to transport such materials to and from reaction vessels, storage vessels, and the like. So long as the material is continously moving and there are no restrictions of any type in the transport lines few problems arise since the lines can be heated as by steam tracing, electrical tape, etc. and/or pressure can be applied to maintain flow. However, serious problems do arise when it is necessary to interrupt flow for some reason. Such interruptions include plant turnarounds, emergency shutdowns, sampling and a large number of other such interruptions. In certain of these instances, such as sampling, it is impractical or uneconomical to maintain the system in a heated and/or pressurized condition at all times, while in most other instances of shutdown the heating and/or pressurizing system is also shutdown. As a result the material being transported will solidify, form plugs or become unduly viscous during a shutdown. Obviously, in most cases, the interruption of flow requires a valve of some type. This, of course, adds to the problem, to the extent that valves are more difficult to maintain in a heated condition and the valve in and of itself is a flow restriction even under normal operating conditions. In addition, once a system is shut down, the valve becomes plugged. Heating and/or pressurizing is only a partial solution since such heating and/or pressurizing causes undue delays in start-up and in some instances damages equipment, such as pumps which are usually started before the material is sufficiently fluent to be pumped. One of the major operations in which these problems are encountered is in the handling and transport of normally solid plastics or resins. These materials are obviously best transported in a liquid condition but once the heating system is shut down for some reason or only intermittent transport is necessary, the material will obviously solidify and plug any flow lines and valves. In addition, in many operations, in the handling of normally solid plastics or resins, the valves are lubricated with the plastic or resin itself in order to prevent contamination. Other operations include sulfur units in which sulfur freezes on valves when they become cold, or where valves are utilized in a normally heated condition and must necessarily be lubricated with highly viscous lubricants which will have a tendency to plug conventional valves when cooled.

While numerous valves have been developed in the art, and many for the handling of normally non-fluent materials, such valves have one major drawback, namely the flow path through the valve is restricted, thus adding to the problems encountered in the handling of normally non-fluent materials or materials which have a tendency to plug readily. This is true since the closure means of such valves are located within the valve body and thus flow is annularly, about, under or through the closure means itself. The tendency to plug, therefore, is great. Plug type valves are one solution to this problem. However, elaborate and expensive sealing, lubrication, etc. are necessary in most of these valves.

SUMMARY OF THE INVENTION

It is therefore an object of the present invention to overcome the above and other problems of the prior art. Another object of the present invention is to provide an improved valve means. Still another object of the present invention is to provide an improved material supply system. A further object of the present invention is to provide an improved valve means and a material supply system. Yet another object of the present invention is to provide an improved valve means and a material supply system including such valve, adapted to handle materials which have a tendency to plug. Another and further object of the present invention is to provide an improved valve means and a material supply system including such valve, which is adapted to handle normally non-fluent material. Yet another object of the present invention is to provide an improved valve means having essentially unrestricted flow channels therethrough. A further object of the present invention is to provide an improved valve means which is essentially self lubricating. A still further object of the present invention is to provide an improved valve means which is lubricated by the material being handled. Another object of the present invention is to provide an improved valve means which is economical to manufacture. Another and further object of the present invention is to provide an improved valve means which requires no elaborate sealing means. These and other objects as advantages of the present invention will be apparent from the following description.

In accordance with the present invention, an improved valve means is provided having at least one passage therethrough terminating in a port in one end of the valve body, a rotatably operated stem means extending through the valve body and terminating beyond the end of the valve body and offset from the port, a closure means fixedly mounted on the free end of the stem and adapted to be rotated through an arc from a first position removed from the port to a second position closing the port, whereby rotation of the stem moves the closure from the first position at which fluid is admitted to the passage through the body of the valve to the second position at which fluid is prevented from entering the passage in the valve body. Preferably, the closure means is resiliently urged toward the end of the valve and hence the valve port. The valve may be included in a system wherein the end carrying the closure means is mounted in the interior of a vessel containing the material to be handled, the valve is adapted to withdraw material from the vessel and a purge fluid supply means is provided adapted to pass a purge fluid through the material withdrawal line and the passage through the valve body.

DESCRIPTION OF THE PREFERRED EMBODIMENTS

When the term "normally non-fluent material" is utilized herein, such term is meant to include any normally solid material which can be handled and transported in a liquid condition, viscous liquids, comminuted solids, slurries of comminuted solids and a carrier gas or liquid and other materials which have a tendency to plug flow lines and valves.

The term "non-restricted passage" when utilized herein is meant to include a passage having no elements mounted therein or reduced diameter portions which will in any way restrict flow therethrough but does not exclude such passages having bends or turns therein.

The present invention will best be understood by the following description, when read in conjunction with the drawings.

Figure 1:
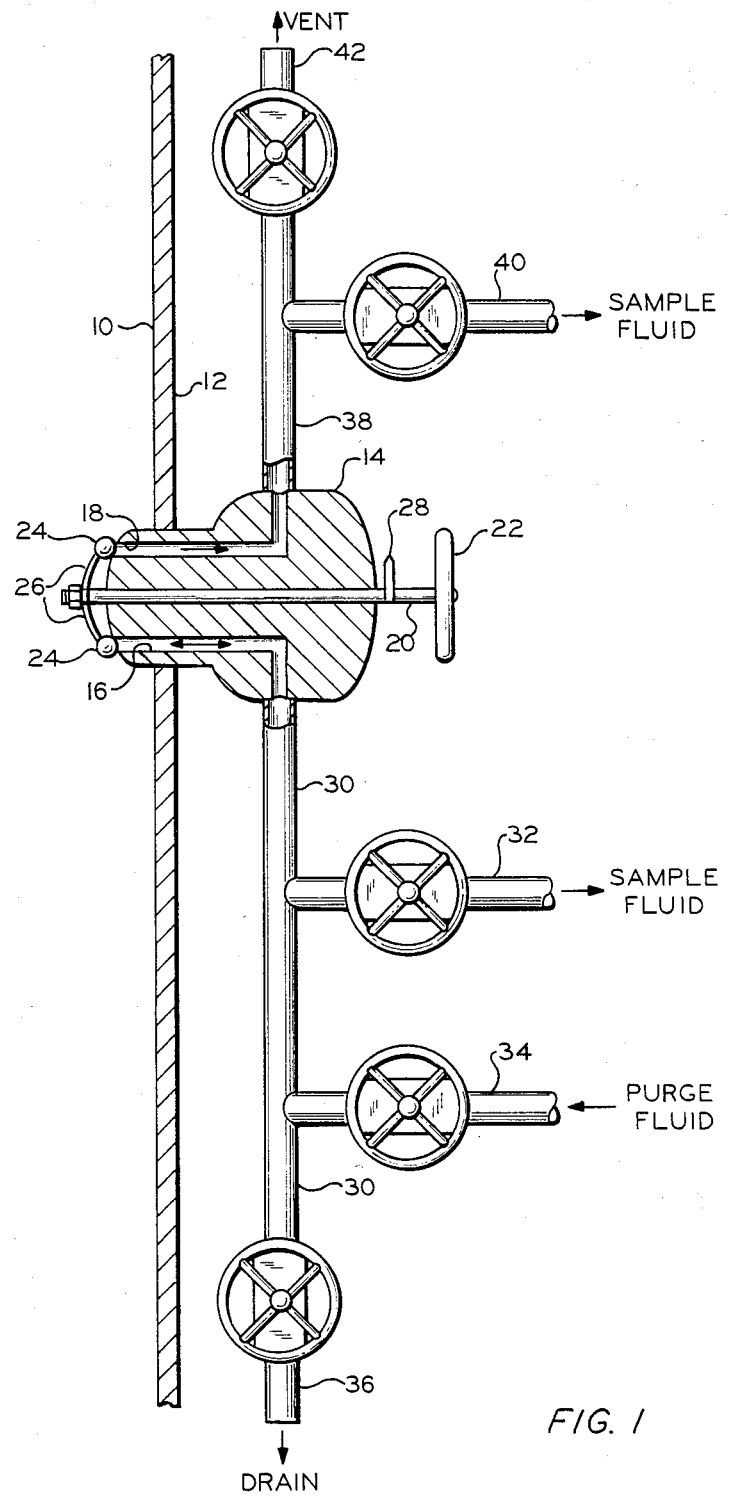
FIG. 1 is an elevational view, partially in section, of a valve in accordance with the present invention mounted in a system for withdrawing samples from a vessel.

FIG. 1 of the drawings is an elevational view, partially in section, of a valve in accordance with the present invention which forms part of a sampling system for at least intervally withdrawing a sample of a normally non-fluent material from a vessel containing such material. In accordance with FIG. 1, a valve in accordance with the present invention is mounted in a vessel having an interior wall 10 and an exterior wall 12. The valve, as such, includes valve body 14 which extends through the wall of the vessel with its free end terminating inside the vessel where it is in contact with the normally non-fluent material to be sampled. The valve is provided with at least one non-restricted passage 16 that generally longitudinally extends through body 14 of the valve. It is to be observed that passage 16 is completely free of obstructions throughout its entire length through the body 14 of the valve. It should also be recognized that while passage 16 has an L-shaped bend in the instance shown. A straight passage or channel could just as readily be provided terminating at the opposite end of the valve body 14. The terminal end of passage 16 is provided with a suitable seat (not shown) for a valve closure. Obviously, the valve can be provided with a single passage 16 or any desirable number of such passages. In the present instance shown, a second passage 18 is provided for purposes hereinafter described. Passing centrally and longitudinally through valve body 14 is valve stem 20 which extends beyond the end of body 14 and into the vessel. The opposite end of stem 20 is provided with a valve handle 22. Obviously, valve stem 20 may be manually operated or automatically operated, as by a solenoid or the like. In any event, valve stem 20 is rotatably mounted within valve body 14. Fixedly mounted on the free end of valve stem 20, so as to rotate with valve stem 20, is a closure means comprising a pair of balls 24. Balls 24 are mounted on valve stem 20 through radially extending resilient arms 26. Resilient arms 26 urge balls 24 into sealing engagement with the ports of passages 16 and 18. As will be more apparent from the description which follows, rotation of valve stem 20 rotates balls 24 away from the ports of passages 16 and 18 in a first position and into sealing engagement with the ports in a second position. An appropriate pointer 28, showing the open and closed position of the valve, can be provided. With the valve in its open position, a fluid sample can be withdrawn through passage 16 and lines 30 and 32. After a sample has been withdrawn, the flow lines in the valve can be cleared by introducing a purge fluid through line 34 through line 32, if desired, and through line 30 and finally through the passage 16 of the valve. The purge fluid will thus clear the flow lines and the passage 16 of the normally non-fluent material, thus preventing any plugging of the flow lines or valve passage. Line 30 can also be provided with an appropriate drain line 36. With the valve open, the normally non-fluent material from the vessel may also be withdrawn through line 38. The material withdrawn through line 38 may be withdrawn through line 40 to provide a second sample or line 40 can be used as means for mounting a pressure gauge or the like. Line 42 may be provided as a vent to the atmosphere. It is to be observed, from the above description and the drawing, that the valve, in accordance with the present invention, is completely free of restrictions in the passages 16 and 18 through the body 14. Further, the passages require no elaborate sealing means and the only seals of any type required is around the stem 20, which of course is a relatively simple and inexpensive proposition. Obviously also, the seats in the ports at the terminal ends of passages 16 and 18 are relatively simple and inexpensive to form. Since the balls 24, the valve seats and the path over which the balls travel during rotation of the stem are exposed to the fluid to be handled by the valve, the valve is thus self-lubricating and contamination of the normally non-fluent material by lubricants is prevented. Accordingly, a simple, inexpensive and rugged valve is provided for the handling of normally non-fluent materials.

Figure 2:
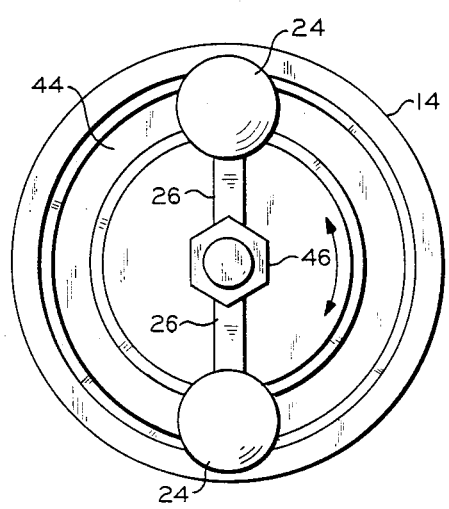
FIG. 2 is an end view of a valve in accordance with the present invention in its closed position.
Figure 3:
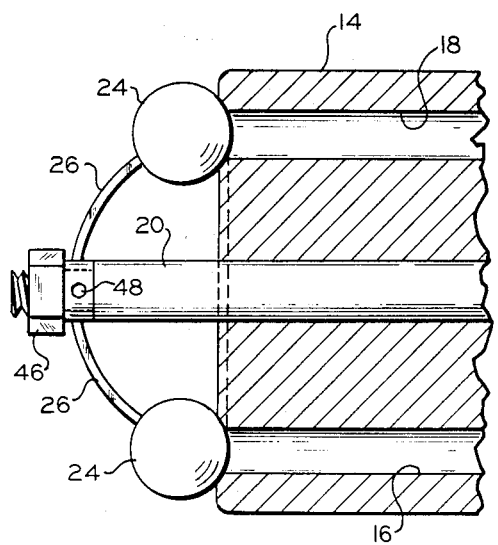
FIG. 3 is a side view, partially in section, of the valve of FIG. 2.

FIGS. 2 and 3 show in greater detail the free end of the valve which is designed to extend into the vessel as illustrated in FIG. 1. Duplicate numbers are utilized on like elements in FIGS. 1, 2 and 3. FIGS. 2 and 3 show the valve in a closed position with balls 24 resting in the seats formed in the ports of passages 16 and 18. Preferably, an annular channel 44 is formed in the end face of valve body 14 to maintain the balls 24 in a desired path for movement in and out of engagement with the valve seats in the ports of passages 16 and 18. Annular channel 44 will, of course, be shaped in conformity with the surface of the balls 24 with which it is in contact. Channel 44 obviously can be easily formed since it is exposed at the free end of valve body 14, thus again reducing the cost of manufacture. The closure means, including balls 24 and resilient arms 26, is fixedly mounted on stem 20 by means of a nut 46. Obviously, the same purpose can be served by a set screw such as set screw 48 or both. Other appropriate means for fixedly mounting the closure means can be provided. It will be obvious to one skilled in the art that the closure means need not be a ball means such as 24 but can be any other appropriate means for closing the ports and passages 16 and 18. Likewise, arms 26 need not be resilient but may be rigid arms and provision can be made for longitudinal adjustment to adjust the pressure between the closure and the valve seats and compensate for wear.

Figure 4:
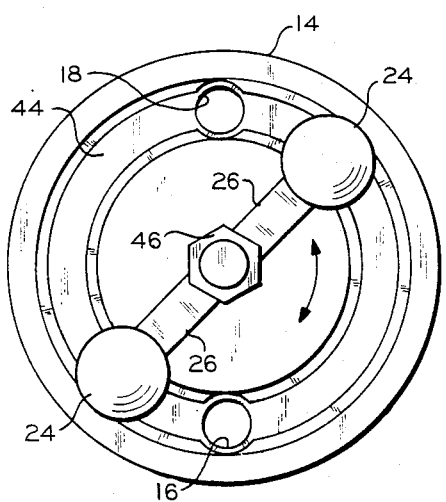
FIG. 4 is an end view of the valve of FIG. 2 in its open position.
Figure 5:
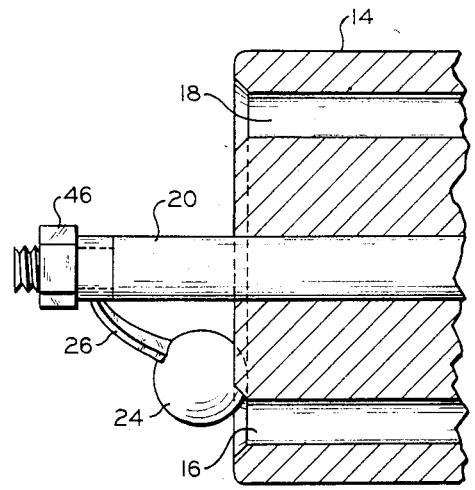
FIG. 5 is a side view, partially in section, of the valve of FIG. 4.
Figure 6:
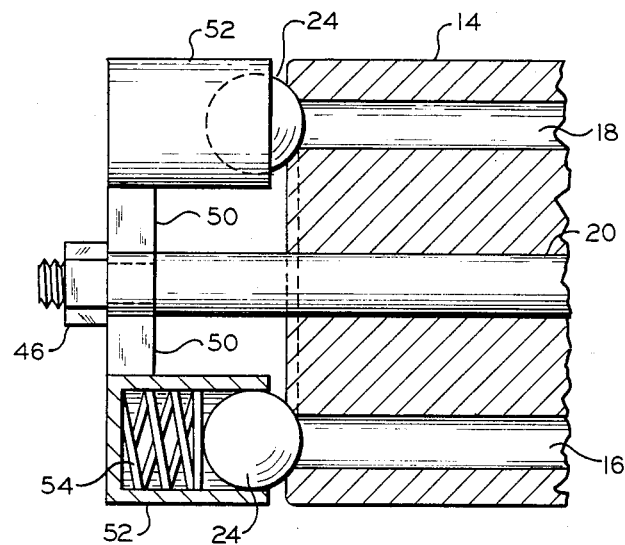
FIG. 6 is a side view, partially in section, of a second embodiment of a valve in accordance with the present invention.

FIGS. 4 and 5 are duplicates of the valve of FIGS. 2 and 3 except that FIGS. 4 and 5 show the valve in its open position. Obviously, a stop means may be provided at the fully opened and fully closed positions. It will also be obvious to one skilled in the art that numerous variations for resiliently mounting the closure means can be provided. FIG. 6 of the drawings shows one such means.

Specifically, in FIG. 6 closure means includes a pair of radial arms 50 fixedly mounted on valve stem 20 which terminate at their free ends in ball retainers 52 for retaining balls 24. In this particular instance, the arms 50 are rigid. Ball retainers 52 are provided with springs 54 which urge balls 24 into contact with the seats of passages 16 and 18. This particular arrangement has the advantage of providing freely rolling balls rather than rigidly mounted balls, thus reducing wear and improving ease of operation.

Figure 7:
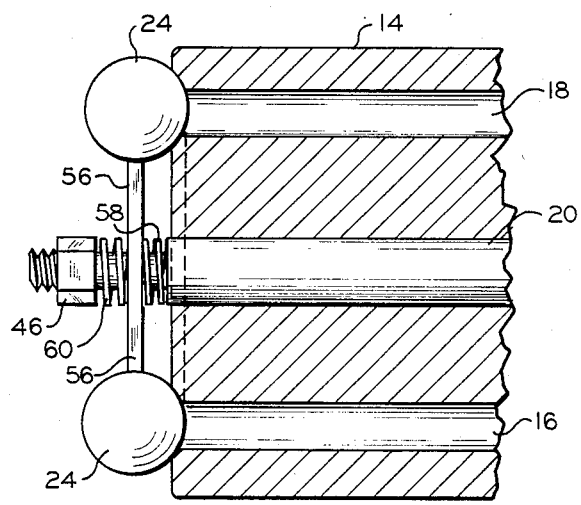
FIG. 7 is a side view, partially in section, of yet another valve in accordance with the present invention.

Yet another means of resiliently mounting the balls 24 is shown in FIG. 7. In this particular instance, rigid arms 56 are longitudinally slidably mounted on a reduced diameter section of stem 20. Obviously for rigid mounting, a set screw or the like may be provided thus permitting rigid mounting with adjustment. Also, on the reduced portion of stem 20 are springs 58 and 60 on either side of the central mounting of arms 56. Accordingly, the contact pressure between the balls 24 and the seats of passages 16 and 18 as well as channel 44 can be adjusted by adjusting nut 46. Free resilient movement of the closure means can be provided in this case by simply forming a longitudinal channel in the extension of stem 20 so that a set screw, key or other means mounts the arms 56 for rotation with stem 20 slidable longitudinally on the extension of stem 20, as permitted by springs 58 and 60. Thus, the pressure between the balls and the seats of passages 16 and 18 can be adjusted by adjusting nut 46 while still permitting resilient pressure on the balls. Obviously, only one of springs 58 and 60 could be utilized.

While specific elements, items of equipment, modes of operation, and the like have been set forth herein, it is to be understood that such specific recitals are for purposes of illustration and setting forth the best mode of operation only and are not to be considered limiting.

I claim:

1. A valve means comprising:
    (a) a valve body;
    (b) a rotatable, straight, two-ended stem passing through said valve body and having a length sufficient to extend beyond both ends of said valve body;
    (c) rotation means mounted on a first, operating end of said stem and adapted to rotate said stem;
    (d) said valve body having at least one elongated, unobstructed passage therethrough, one end of said passage being generally parallel to and offset from said stem and terminating in a circular port in the end of said body adjacent the second, operable end of said stem;
    (e) a radially-disposed arm having one end connected to said second, operable end of said stem to rotate therewith and the free end thereof extending to a point adjacent said port; and
    (f) a ball-type closure mounted on said free end of said arm, larger than said port, to thereby fit against said port in sealing engagement with said port, and resiliently urged toward said port;
    (g) whereby rotation of said stem moves said ball-type closure through an arc from a first position removed from said port, at which said port and said passage are open, to a second position in engagement with said port, at which said port and said passage are closed;
    (h) said end of said valve body adjacent said second, operable end of said stem has formed therein an arcuate channel coincident with said arcuate path traveled by said ball-type closure from said first position to said second position and having a cross-sectional shape generally conforming to the shape of said ball-type closure, whereby said channel guides said ball-type closure from said first position to said second position.

2. The valve means in accordance with claim 1 wherein the radially disposed arm is resilient and adapted to thus resiliently urge the ball-type closure toward the port.

3. Valve means in accordance with claim 1 wherein the valve body has at least two, independent passages therethrough having one of their ends generally parallel to the stem and offset equal distances from said stem and terminating in circular ports in the end of the body adjacent the operable end of said stem.

4. Valve means in accordance with claim 3 which includes radially-disposed arms and ball-type closures equal in number to the number of the passages and ports.

5. Valve means in accordance with claim 4 which includes two passages terminating in two ports 180° apart, two radially-disposed arms and two ball-type closures.

6. A system for transporting fluid to and from a vessel containing said fluid comprising:
    (a) a valve means having one end extending into said vessel and including (1) a valve body; (2) a rotatable, straight, two-ended stem passing through said valve body and having a length sufficient to extend beyond both ends of said valve body; (3) rotation means mounted on a first, operating end of said stem and adapted to rotate said stem, said valve body having at least one elongated, unobstructed passage therethrough, one end of said passage being generally parallel to and offset from said stem and terminating in a circular port in the end of said body adjacent the second, operable end of said stem; (4) a radially-disposed arm having one end conected to said second, operable end of said stem to rotate therewith and the free end thereof extending to a point adjacent said port; and (5) a ball-type closure mounted on said free end of said arm, larger than said port, to thereby fit against said port in sealing engagement with said port and resiliently urged toward said port, whereby rotation of said stem moves said ball-type closure through an arc from a first position removed from said port, at which said port and said passage are open, to a second position in engagement with the said port, at which said port and said passage are closed; said end of said valve body adjacent said second, operable end of said stem has formed therein an arcuate channel coincident with said arcuate path traveled by said ball-type closure from said first position to said second position and having a cross sectional shape generally conforming to the shape of said ball-type closure, whereby said channel guides said ball-type closure from said first position to said second position; and (b) at least one flow line connected to and in open communication with the end of the passage opposite the thus ported end of said passage.

7. A system in accordance with claim 6 wherein the radially-disposed arm is resilient and adapted to thus resiliently urge the ball-type closure toward the port.

8. A system in accordance with claim 6 wherein the valve body has at least two, independent passages therethrough, having one of their ends generally parallel to the stem and offset equal distances from said stem and terminating in circular ports in the end of said body adjacent the operable end of said stem.

9. A system in accordance with claim 8 which includes radially-disposed arms and ball-type closures equal in number to the number of passages and ports.

10. A system in accordance with claim 9 which includes two passages terminating in two ports 180° apart, two radially disposed arms and two ball-type closures.

11. A system in accordance with claim 6 wherein the flow line additionally includes means for passing a purge fluid through the passage.

12. A system in accordance with claim 6 wherein the fluid is a normally non-fluent material.

13. A system in accordance with claim 12 wherein the fluid is a normally solid material adapted to be rendered fluent upon heating.

* * * * *